United States Patent
Kubo (10) Patent No.: US 11,843,427 B2
(45) Date of Patent: Dec. 12, 2023

(54) WIRELESS COMMUNICATION SYSTEM, ELECTRICAL DEVICE, AND WIRELESS COMMUNICATION TAG

(71) Applicant: Murata Manufacturing Co., Ltd., Nagaokakyo (JP)

(72) Inventor: Hiroyuki Kubo, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 372 days.

(21) Appl. No.: 17/342,840

(22) Filed: Jun. 9, 2021

(65) Prior Publication Data

US 2021/0297113 A1  Sep. 23, 2021

Related U.S. Application Data (63) Continuation of application No. PCT/JP2019/048917, filed on Dec. 13, 2019.

(30) Foreign Application Priority Data

Dec. 14, 2018  (JP) ................................. 2018-234083

(51) Int. Cl.
  *H04B 5/00* (2006.01)
  *H01Q 7/00* (2006.01)

(52) U.S. Cl.
  CPC .............. *H04B 5/0081* (2013.01); *H01Q 7/00* (2013.01)

(58) Field of Classification Search
  CPC ...... G06K 19/077; H01Q 1/2208; H01Q 7/00; H04B 5/0081
  See application file for complete search history.

(56) References Cited

U.S. PATENT DOCUMENTS

| | | |
|---|---|---|
| 2013/0050035 A1 | 2/2013 | Kato et al. |
| 2017/0277990 A1* | 9/2017 | Tokunaga .......... G06K 19/0725 |
| 2019/0181544 A1* | 6/2019 | Kim .................. H01Q 7/00 |

FOREIGN PATENT DOCUMENTS

| | | |
|---|---|---|
| JP | 2016057892 A | 4/2016 |
| JP | 2017037388 A | 2/2017 |
| WO | 2011135934 A1 | 11/2011 |
| WO | 2014141906 A1 | 9/2014 |

OTHER PUBLICATIONS

International Search Report issued for PCT/JP2019/048917, dated Feb. 25, 2020.
Written Opinion of the International Searching Authority issued for PCT/JP2019/048917, dated Feb. 25, 2020.

* cited by examiner

*Primary Examiner* — Nguyen T Vo
(74) *Attorney, Agent, or Firm* — ArentFox Schiff LLP (57) ABSTRACT

A wireless communication system is provided that includes a first unit, a coil antenna, a conductive ring, a second unit, and a wireless communication tag. A first coil conductor of the coil antenna is disposed along a first side surface of the first unit. The conductive ring is disposed along the first side surface of the first unit and has a slit. The second unit has a second side surface and is fixed to the first unit so as to be removable from the first unit in a first direction. The wireless communication tag includes a second coil conductor and is disposed along the second side surface of the second unit. In the first direction, a first shortest distance between the conductive ring and the second coil conductor is shorter than a second shortest distance between the first coil conductor and the second coil conductor.

20 Claims, 7 Drawing Sheets

WIRELESS COMMUNICATION SYSTEM, ELECTRICAL DEVICE, AND WIRELESS COMMUNICATION TAG

CROSS REFERENCE TO RELATED APPLICATIONS

The present application is a continuation of PCT/JP2019/048917 filed Dec. 13, 2019, which claims priority to Japanese Patent Application No. 2018-234083, filed Dec. 14, 2018, the entire contents of each of which are incorporated herein by reference.

TECHNICAL FIELD

The present invention generally relates to a wireless communication system, an electrical device, and a wireless communication tag, and more particularly, to a wireless communication system including a coil antenna and a wireless communication tag, an electrical device including this wireless communication system, and a wireless communication tag used in the wireless communication system.

BACKGROUND

Currently, a communication terminal including a terminal housing and a card antenna module is known as disclosed in International Publication No. 2011/135934 (hereinafter "Patent Document 1", for example).

In the communication terminal disclosed in Patent Document 1, a terminal housing includes a terminal-housing antenna, while a card antenna module includes a coupling coil to couple with the terminal-housing antenna. The terminal-housing antenna and the coupling coil are both coil antennas whose winding axes coincide with each other.

In the communication terminal disclosed in Patent Document 1, the specific area where the terminal housing and the card antenna module oppose each other is required for the coupling, thereby making it difficult to reduce the size of the communication terminal. It is also difficult to secure a sufficient space depending on the positional arrangement of objects and other function components.

SUMMARY OF THE INVENTION

In view of the above-described problems of the system in Patent Document 1, a wireless communication system is provided in which a coil antenna is disposed in a first unit and a wireless communication tag is disposed in a second unit. In this wireless communication system, information is sent and received by a coupling between the coil antenna and the wireless communication tag.

In the above-described wireless communication system, however, it is difficult to achieve sufficient coupling between the coil antenna and the wireless communication tag. In particular, depending on the position of the wireless communication tag with respect to the coil antenna in the circumferential direction, sufficient coupling between the coil antenna and the wireless communication tag is not exhibited.

The exemplary embodiments of the present invention have been made in terms of the above-described issues. Thus, it is an object of the invention to provide a wireless communication system, an electrical device, and a wireless communication tag that enhances coupling between a coil antenna and a wireless communication tag.

Accordingly, a wireless communication system according to an exemplary aspect is provided that includes a first unit, a coil antenna, a conductive ring, a second unit, and a wireless communication tag. The first unit includes a first side surface formed by one or plural surfaces. The coil antenna includes a first coil conductor. Moreover, the first coil conductor is wound along the first side surface of the first unit. The conductive ring is disposed along the first side surface of the first unit and has a slit in a direction perpendicular to a winding direction of the first coil conductor. The second unit includes a second side surface formed by one or plural surfaces and is fixed to the first unit so as to be removable from the first unit in a first direction. The wireless communication tag includes a second coil conductor and is disposed along the second side surface of the second unit. In the first direction, a first shortest distance between the conductive ring and the second coil conductor is shorter than a second shortest distance between the first coil conductor and the second coil conductor.

According to an exemplary aspect, an electrical device is provided that includes the above-described wireless communication system, an operating section, and a controller. The operating section operates in a predetermined manner. The controller controls the operating section in accordance with information stored in the wireless communication tag.

In addition, according to an exemplary aspect, a wireless communication tag is provided that is configured to be used in a wireless communication system. The wireless communication system includes a first unit, a coil antenna, a conductive ring, a second unit, and a tag. The first unit includes a first side surface formed by one or plural surfaces. The coil antenna includes a first coil conductor that is wound along the first side surface of the first unit. The conductive ring is disposed along the first side surface of the first unit and has a slit in a direction perpendicular to a winding direction of the first coil conductor. The second unit includes a second side surface formed by one or plural surfaces and is fixed to the first unit so as to be removable from the first unit in a first direction. The tag is disposed along the second side surface of the second unit. The wireless communication tag is used as the tag of the wireless communication system. The wireless communication tag includes a second coil conductor. In the first direction, a first shortest distance between the conductive ring and the second coil conductor is shorter than a second shortest distance between the first coil conductor and the second coil conductor.

With the use of the wireless communication system, the electrical device, and the wireless communication tag according to the above-described aspects, coupling between the coil antenna and the wireless communication tag is enhanced compared with conventional systems.

DETAILED DESCRIPTION OF EMBODIMENTS

Wireless communication systems, electrical devices, and wireless communication tags according to first and second exemplary embodiments will be described below with reference to the drawings. In general, FIGS. 1 through 8 to be referred to in the following embodiments and modified examples are only schematically represented, and the ratio of the size or the thickness of a component to that of another component does not necessarily reflect the actual ratio of these components as should be appreciated to those skilled in the art.

First Exemplary Embodiment (1) Overall Configuration of Wireless Communication System The overall configuration of a wireless communication system 1 according to a first exemplary embodiment will be described below with reference to the drawings.

Figure 1:
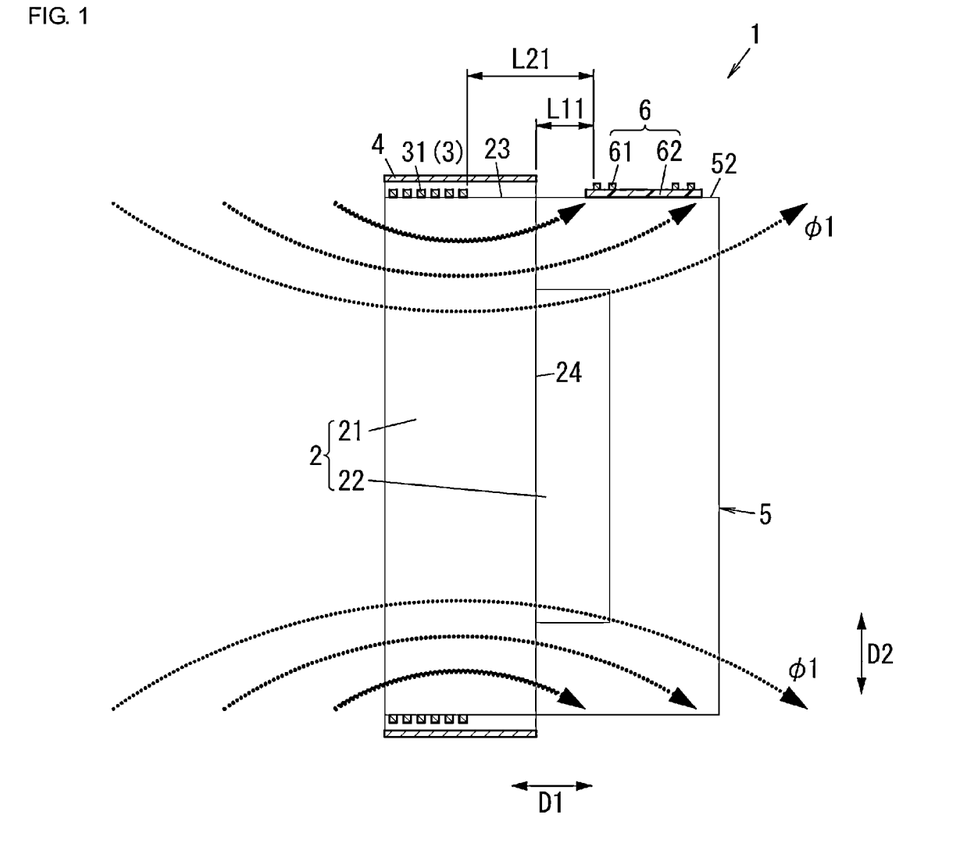
FIG. 1 is a schematic view of a wireless communication system according to a first exemplary embodiment.

As shown in FIG. 1, the wireless communication system 1 includes a first unit 2, a coil antenna 3, a conductive ring 4, a second unit 5, and a wireless communication tag 6.

The wireless communication system 1 is used for an electric toothbrush, an electric tool, a game machine, or a vacuum cleaner, for example.

(2) Elements of Wireless Communication System

The individual elements of the wireless communication system 1 will be explained below with reference to the drawings.

(2.1) First Unit

Figure 2:
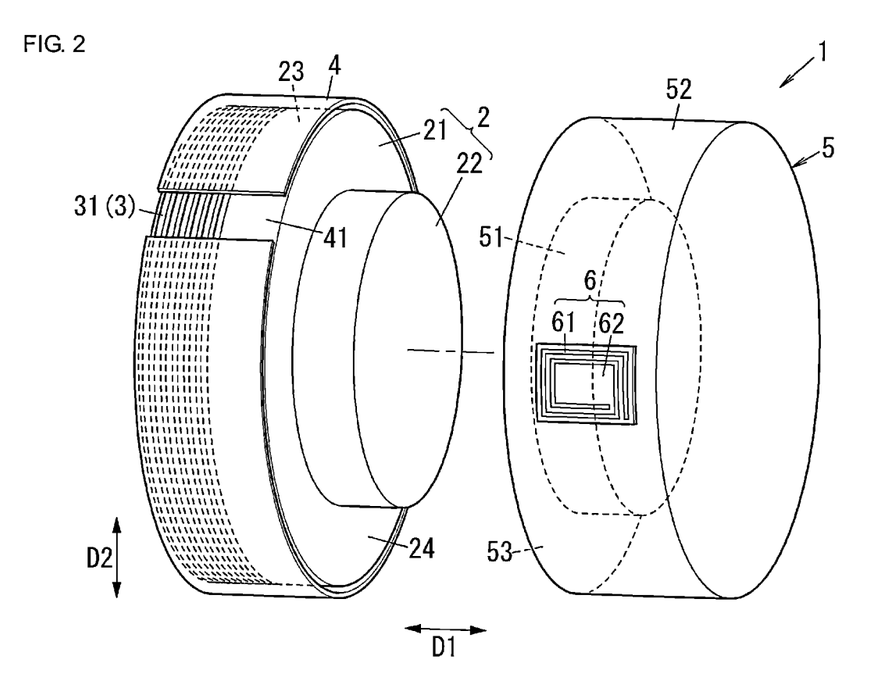
FIG. 2 is a perspective view of the wireless communication system according to the first exemplary embodiment.

As shown in FIG. 2, the first unit 2 includes a base portion 21 (or base) and a projecting portion 22 (or projection). The projecting portion 22 is integrally formed with the base portion 21. The material for the first unit 2 is a resin. The permeability of the first unit 2 is higher than that of a metal, for example, in an exemplary aspect.

The base portion 21 has a first side surface 23, which is one continuous surface, and an opposing surface 24. The base portion 21 is tubular or columnar. The axis of the base portion 21 extends in a first direction D1. As further shown, the outer shape of the base portion 21 is circular as viewed from the first direction D1. The first direction D1 is a direction in which the second unit 5 is fixed to or removed from the first unit 2.

The projecting portion 22 projects from the base portion 21. More specifically, the projecting portion 22 projects from the opposing surface 24 of the base portion 21 in the first direction D1. The projecting portion 22 is tubular or columnar. The axis of the projecting portion 22 extends in the first direction D1 and the projecting portion 22 is coaxial with the base portion 21. The outer shape of the projecting portion 22 is circular as viewed from the first direction D1.

(2.2) Coil Antenna

As shown in FIGS. 1 and 2, the coil antenna 3 includes a first coil conductor 31. The first coil conductor 31 is disposed along the first side surface 23 of the first unit 2. More specifically, the first coil conductor 31 is disposed on the first side surface 23 of the first unit 2.

(2.3) Conductive Ring

As shown in FIGS. 1 and 2, the conductive ring 4 is disposed along the first side surface 23 of the first unit 2. For example, the conductive ring 4 is fitted onto the first unit 2. The conductive ring 4 is formed in a band-like shape and has conductivity. The material for the conductive ring 4 is a metal, such as copper, in an exemplary aspect.

The conductive ring 4 is formed to have a slit 41 when it is disposed on the first side surface 23 of the first unit 2. The slit 41 is formed in a direction perpendicular to the winding direction of the first coil conductor 31. This configuration is provide to prevent the formation of a closed loop in the conductive ring 4. Because of the provision of the slit 41, in the circumferential direction of the first unit 2, the conductive ring 4 does not entirely cover the first side surface 23 of the first unit 2, but leaves part of the first side surface 23 exposed.

The conductive ring 4 of the first embodiment overlaps the first coil conductor 31 of the coil antenna 3, as viewed from a second direction D2 perpendicular to the first direction D1. More specifically, as viewed from the second direction D2, the conductive ring 4 covers the entirety of the first coil conductor 31 in the first direction D1. The conductive ring 4 covers the first coil conductor 31, except for the portion where the slit 41 is formed, as viewed from the second direction D2.

In the second direction D2 perpendicular to the first direction D1, the conductive ring 4 is disposed outward of the first coil conductor 31 of the coil antenna 3 with respect to the winding axis of the first coil conductor 31. That is, the conductive ring 4 covers the first coil conductor 31 as well as the first side surface 23 of the first unit 2. Because of the provision of the slit 41, the conductive ring 4 does not entirely cover the first coil conductor 31, but leaves part of the first coil conductor 31 exposed.

(2.4) Second Unit

As shown in FIGS. 1 and 2, in the first direction D1, the second unit 5 is fixed to the first unit 2 such that it is removable from the first unit 2. The second unit 5 has a recessed portion 51, a second side surface 52, which is one continuous surface, and an opposing surface 53. The recessed portion 51 receives the projecting portion 22 of the first unit 2 therein. The second unit 5 is tubular or columnar. The axis of the second unit 5 extends in the first direction D1. The outer shape of the second unit 5 is circular as viewed from the first direction D1. The material for the second unit 5 is a resin in an exemplary aspect. The permeability of the second unit 5 is higher than that of a metal, for example.

In the first exemplary embodiment, when the second unit 5 is fixed to the first unit 2, the second side surface 52 becomes flush with the first side surface 23 of the first unit 2. The configuration of the second side surface 52 being flush with the first side surface 23 includes a state in which the second side surface 52 and the first side surface 23 are substantially flush with each other, as well as a state in which the second side surface 52 and the first side surface 23 are perfectly flush with each other, wherein the term "substantially" takes into account minor differences in diameter, which may result from manufacturing variations, for example.

(2.5) Wireless Communication Tag

As shown in FIGS. 1 and 2, the wireless communication tag 6 includes a second coil conductor 61, a substrate 62, and an RFIC (not shown). The second coil conductor 61 is a planar coil and is disposed on the substrate 62 such that it is wound at plural turns. The material for the second coil conductor 61 is a metal, such as copper, in an exemplary aspect. The substrate 62 is a resin substrate, for example. On the substrate 62, the second coil conductor 61 and the RFIC are provided. The RFIC stores predetermined information.

Moreover, the wireless communication tag 6 is disposed on the second unit 5 in the exemplary embodiment. More specifically, the wireless communication tag 6 is disposed on the second side surface 52 of the second unit 5. In the first embodiment, as discussed above, since the second side surface 52 of the second unit 5 is flush with the first side surface 23 of the first unit 2, the wireless communication tag 6 is located adjacent to the first coil conductor 31 in the first direction D1.

(3) Positional Relationships Among Conductive Ring, First Coil Conductor, and Second Coil Conductor As shown in FIG. 1, in the first direction D1, an end portion of the conductive ring 4 is closer to the wireless communication tag 6 than an end portion of the first coil conductor 31 is. In other words, in the first direction D1, the end portion of the conductive ring 4 on the side of the wireless communication tag 6 is positioned between the wireless communication tag 6 and the end portion of the first coil conductor 31 on the side of the wireless communication tag 6.

Accordingly, in the first direction D1, a first shortest distance L11 between the conductive ring 4 and the second coil conductor 61 is shorter than a second shortest distance L21 between the first coil conductor 31 and the second coil conductor 61. The first shortest distance L11 is the distance between the end portion of the conductive ring 4 on the side of the wireless communication tag 6 and the end portion of the second coil conductor 61 on the side of the conductive ring 4 in the first direction D1. The second shortest distance L21 is the distance between the end portion of the first coil conductor 31 on the side of the wireless communication tag 6 and the end portion of the second coil conductor 61 on the side of the first coil conductor 31 in the first direction D1.

(4) Magnetic Flux Path

The path of magnetic flux $\phi 1$ generated from the coil antenna 3 will be discussed below with reference to FIG. 1.

As stated above, in the first direction D1, the first shortest distance L11 between the conductive ring 4 and the second coil conductor 61 is shorter than the second shortest distance L21 between the first coil conductor 31 and the second coil conductor 61. That is, the front edge of the conductive ring 4 is positioned closer to the wireless communication tag 6 than the front edge of the first coil conductor 31. To put it another way, in the first direction D1, the end portion of the conductive ring 4 on the side of the wireless communication tag 6 is positioned closer to the wireless communication tag 6 than the end portion of the first coil conductor 31 on the side of the wireless communication tag 6 is. Hence, the magnetic flux $\phi 1$ generated from the coil antenna 3 takes the long way around toward the wireless communication tag 6 so as to avoid the conductive ring 4. This configuration will be discussed below in detail.

In the exemplary embodiment, the conductive ring 4 does not transmit the magnetic flux 41. The density of magnetic flux becomes high in the shortest path to a destination. Hence, without the conductive ring 4, the magnetic flux generated from the coil antenna 3 takes the short way toward the wireless communication tag 6 and passes near the first coil conductor 31. On the other hand, with the conductive ring 4, the magnetic flux $\phi 1$ takes the long way around toward the wireless communication tag 6 so as to avoid the conductive ring 4 because the conductive ring 4 does not transmit the magnetic flux 41. In the first direction D1, the front edge of the conductive ring 4 is positioned closer to the wireless communication tag 6 than the front edge of the first coil conductor 31 is. The magnetic flux $\phi 1$ generated from the coil antenna 3 thus takes the long way around to extend toward the wireless communication tag 6, instead of taking the short way to pass near the first coil conductor 31.

It is thus seen that, with the conductive ring 4, a greater amount of magnetic flux $\phi 1$ creates interlinkage with the second coil conductor 61 of the wireless communication tag 6 than without the conductive ring 4. This configuration enhances coupling between the coil antenna 3 and the wireless communication tag 6, compared with the configuration in which the conductive ring 4 is not provided.

The conductive ring 4 is disposed on the entirety of the coil antenna 3 in the circumferential direction, except for the portion where the slit 41 is formed. Hence, when the second unit 5 is fixed to the first unit 2, a greater amount of magnetic flux $\phi 1$ creates interlinkage with the second coil conductor 61 of the wireless communication tag 6, no matter where the wireless communication tag 6 is disposed on the second side surface 52. This enhances coupling between the coil antenna 3 and the wireless communication tag 6 regardless of the position of the wireless communication tag 6 when the second unit 5 is fixed to the first unit 2.

As discussed above, in the second direction D2, the conductive ring 4 is disposed outward of the first coil conductor 31 of the coil antenna 3. Magnetic flux becomes stronger inward of the first coil conductor 31 than outward thereof. The conductive ring 4 is not provided at a position at which the magnetic flux becomes strong, so that a greater amount of magnetic flux $\phi 1$ can create interlinkage with the wireless communication tag 6.

(5) Advantages

In the wireless communication system 1 according to the first embodiment, the conductive ring 4 serves to facilitate the induction of the magnetic flux $\phi 1$ generated from the coil antenna 3 to the wireless communication tag 6. This enhances coupling between the coil antenna 3 and the wireless communication tag 6.

In the wireless communication system 1 according to the first embodiment, no matter where the wireless communication tag 6 is disposed with respect to the coil antenna 3 in the circumferential direction, coupling between the coil antenna 3 and the wireless communication tag 6 can be enhanced.

In the wireless communication system 1 according to the first embodiment, it is less likely that magnetic flux passes through a gap between adjacent conductor portions in the first coil conductor 31. The magnetic flux can thus take the long way around toward the wireless communication tag 6.

In the wireless communication system 1 according to the first embodiment, the wireless communication tag 6 may be disposed at any position with respect to the coil antenna 3 in the circumferential direction according to exemplary aspects. It is thus possible to enhance coupling between the coil antenna 3 and the wireless communication tag 6, regardless of where the wireless communication tag 6 is disposed on the second unit 5.

In the wireless communication system 1 according to the first embodiment, the conductive ring 4 is not provided at a position at which the magnetic flux $\phi1$ is concentrated, thereby further enhancing coupling between the coil antenna 3 and the wireless communication tag 6.

(6) Modified Examples

Modified examples of the first embodiment will be described below.

(6.1) First Modified Example

Figure 3:
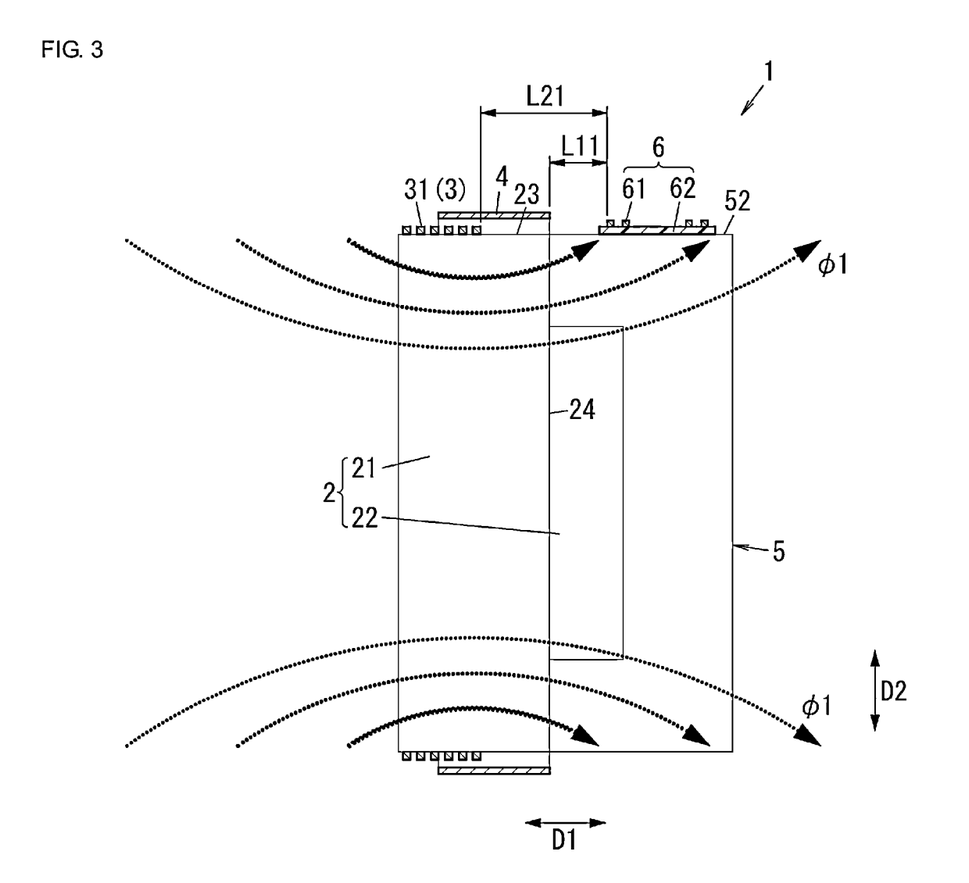
FIG. 3 is a schematic view of a wireless communication system according to a modification of the first exemplary embodiment.

As shown in FIG. 1, the conductive ring 4 in the first embodiment covers the entirety of the first coil conductor 31 in the first direction D1, as viewed from the second direction D2 perpendicular to the first direction D1. However, the conductive ring 4 may not necessarily cover the entirety of the first coil conductor 31. Instead, as shown in FIG. 3, the conductive ring 4 may cover at least part of the first coil conductor 31 in the first direction D1, as viewed from the second direction D2. That is, it is sufficient if the conductive ring 4 overlaps at least part of the first coil conductor 31, as viewed from the second direction D2 perpendicular to the first direction D1.

In the wireless communication system 1 according to the first modified example, too, it is less likely that the magnetic flux $\phi1$ passes through a gap between adjacent conductor portions in the first coil conductor 31. The magnetic flux $\phi1$ can thus take the long way around toward the wireless communication tag 6.

(6.2) Second Modified Example

In the first embodiment, the first unit 2 includes the projecting portion 22, while the second unit 5 includes the recessed portion 51. As a second modified example of the first embodiment, the first unit 2 may include a recessed portion, while the second unit 5 may include a projecting portion. That is, one of the first unit 2 and the second unit 5 includes a projecting portion, and the other one includes a recessed portion according to the differing embodiments.

In the wireless communication system 1 according to the second modified example, too, the wireless communication tag 6 may be disposed at any position with respect to the coil antenna 3 in the circumferential direction. It is thus possible to enhance coupling between the coil antenna 3 and the wireless communication tag 6, regardless of where the wireless communication tag 6 is disposed.

(6.3) Third Modified Example

Figure 4:
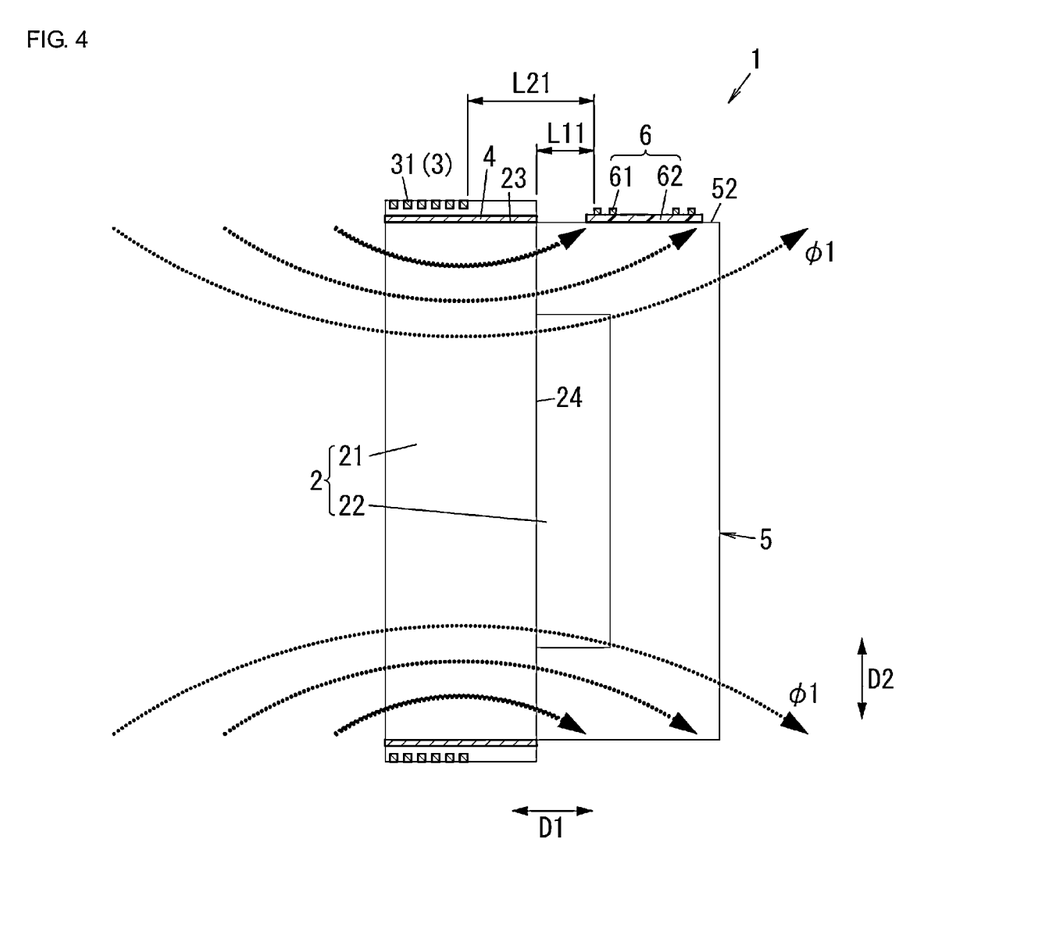
FIG. 4 is a schematic view of a wireless communication system according to another modification the first exemplary embodiment.

As discussed above, in the first embodiment, in the second direction D2 perpendicular to the first direction D1, the conductive ring 4 is disposed outward of the first coil conductor 31 (see FIG. 1). As a third modified example of the first embodiment, the conductive ring 4 can be disposed inward of the first coil conductor 31 in the second direction D2, as shown in FIG. 4.

In the third modified example, the conductive ring 4 is disposed inward of the first coil conductor 31 where the magnetic flux $\phi1$ becomes strong. The magnetic flux $\phi1$ thus becomes less strong than when the conductive ring 4 is disposed outward of the first coil conductor 31. Nonetheless, the conductive ring 4 is still disposed such that the first shortest distance L11 becomes shorter than the second shortest distance L21. Hence, in the third modified example, as well as in the first embodiment, with the conductive ring 4, a greater amount of magnetic flux $\phi1$ can create interlinkage with the wireless communication tag 6 than without the conductive ring 4.

(6.4) Fourth Modified Example

Figure 5:
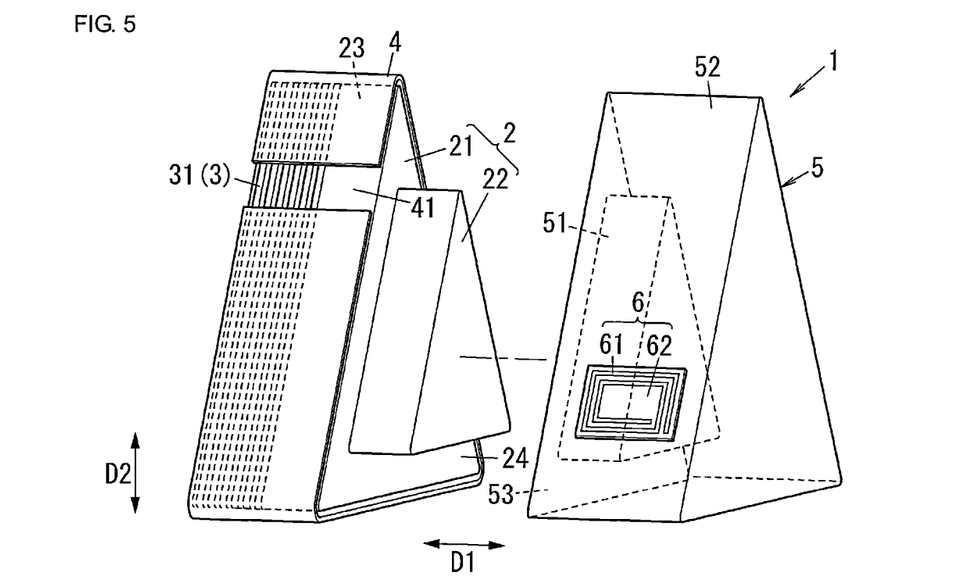
FIG. 5 is a perspective view of a wireless communication system according to yet another modification of the first exemplary embodiment in which a first side surface of a first unit, a second side surface of a second unit, and a projecting portion of the first unit are regular triangles.
Figure 6:
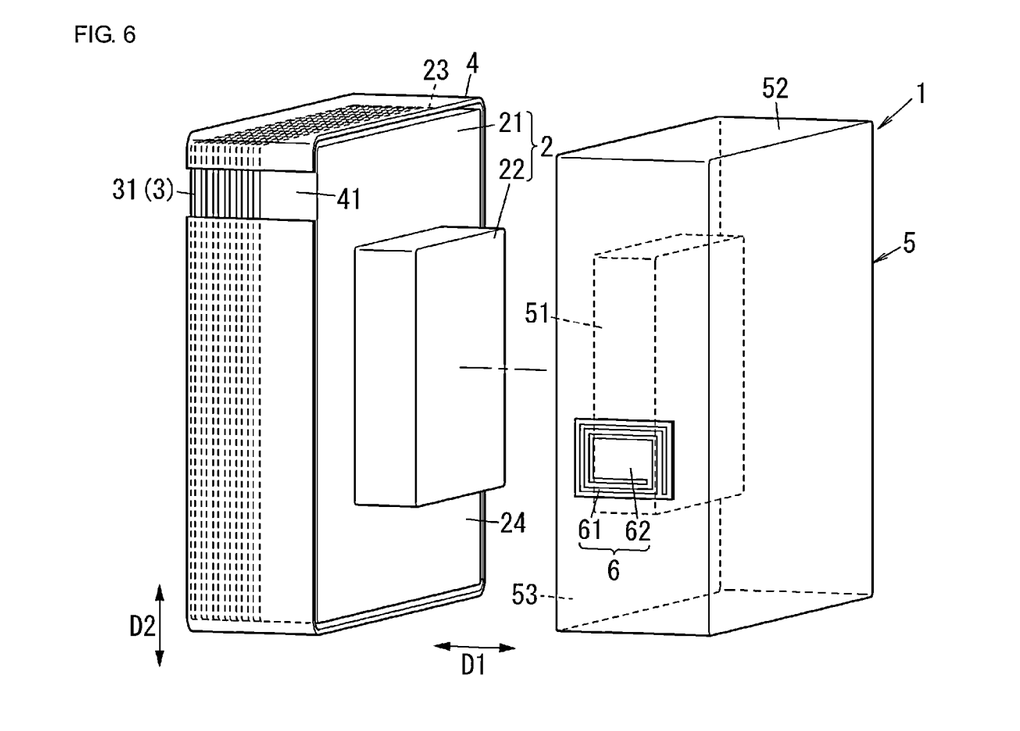
FIG. 6 is a perspective view of a wireless communication system according to the modification of FIG. 5 in which the first side surface of the first unit, the second side surface of the second unit, and the projecting portion of the first unit are squares.
Figure 7:
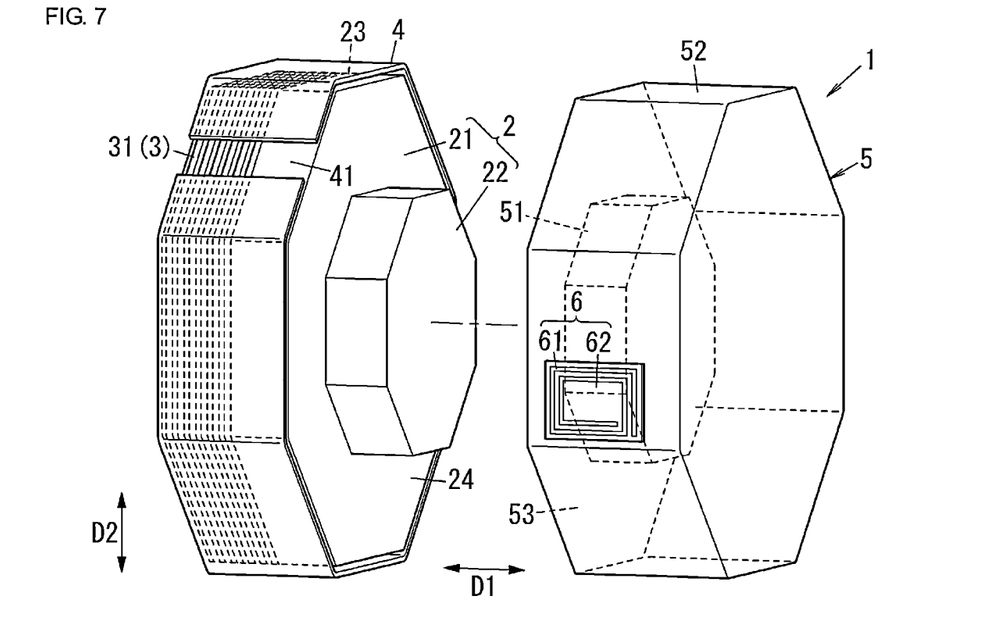
FIG. 7 is a perspective view of a wireless communication system according to the modification of FIG. 5 of the first exemplary embodiment in which the first side surface of the first unit, the second side surface of the second unit, and the projecting portion of the first unit are regular octagons.

The outer shapes of the first side surface 23 of the first unit 2 and the second side surface 52 of the second unit 5 as viewed from the first direction D1 are not limited to a circular shape such as that shown in FIG. 2, and may be a polygonal shape (including a regular polygonal shape) such as those shown in FIGS. 5 through 7, for example. In this case, the first side surface 23 of the first unit 2 and the second side surface 52 of the second unit 5 are each formed by multiple surfaces coupled to each other instead of one continuous surface.

As also shown, the outer shape of the projecting portion 22 of the first unit 2 as viewed from the first direction D1 is not limited to a circular shape such as that shown in FIG. 2, and may be a polygonal shape (including a regular polygonal shape) such as those shown in FIGS. 5 through 7, for example. The outer shape of the projecting portion 22 of the first unit 2 can be formed in any shape if the second unit 5 is fixable to the first unit 2 at least two positions of the second unit 5. That is, if the projecting portion 22 has such an outer shape, it may be formed in a shape other than a circular or regular polygonal shape.

For example, if the shape of the projecting portion 22 is a regular triangle, as shown in FIG. 5, the second unit 5 can be fixed to the first unit 2 in any state in which the second unit 5 is rotated by any multiple of 120° with respect to the first unit 2. If the shape of the projecting portion 22 is a square, as shown in FIG. 6, the second unit 5 can be fixed to the first unit 2 in any state in which the second unit 5 is rotated by any multiple of 90° with respect to the first unit 2. If the shape of the projecting portion 22 is a regular octagon, as shown in FIG. 7, the second unit 5 can be fixed to the first unit 2 in any state in which the second unit 5 is rotated by any multiple of 45° with respect to the first unit 2.

Moreover, the outer shapes of the first side surface 23 of the first unit 2, the second side surface 52 of the second unit 5, and the projecting portion 22 of the first unit 2 (shapes as viewed from the first direction D1) can be the same shape or different shapes. That is, the outer shapes of the first side surface 23 of the first unit 2, the second side surface 52 of the second unit 5, and the projecting portion 22 of the first unit 2 may be formed in a combination of various shapes.

(6.5) Other Modified Examples

In the first unit 2, the projecting portion 22 may not necessarily be formed integrally with the base portion 21, and may be separately formed from the base portion 21.

The first coil conductor 31 may not necessarily be disposed outward of the first unit 2, and may be molded into the first unit 2. In this case, too, the first coil conductor 31 is molded into the first unit 2 such that it is disposed along the first side surface 23.

Moreover, the conductive ring 4 may not necessarily be fitted onto the first unit 2, and may be disposed on the first side surface 23 by being attached thereto. Alternatively, the conductive ring 4 may be molded into the first unit 2.

The front edge of the conductive ring 4 may not be necessarily located at the same position of the opposing surface 24 of the first unit 2 in the first direction D1. The front edge of the conductive ring 4 may be positioned toward the wireless communication tag 6 beyond the opposing surface 24 of the first unit 2. In other words, in the first direction D1, the end portion of the conductive ring 4 on the side of the wireless communication tag may be located toward the wireless communication tag 6 beyond the opposing surface 24 of the first unit 2. For example, the front edge of the conductive ring 4 may be located at the same position as the outermost periphery of the second coil conductor 61 of the wireless communication tag 6. This configuration enables the magnetic flux φ1 generated from the coil antenna 3 to take the longer way around toward the wireless communication tag 6. A greater amount of magnetic flux φ1 can thus create interlinkage with the second coil conductor 61 of the wireless communication tag 6. That is, the front edge of the conductive ring 4 may be located even closer to the wireless communication tag 6 on the condition that the first shortest distance L11 between the conductive ring 4 and the second coil conductor 61 is shorter than the second shortest distance L21 between the first coil conductor 31 and the second coil conductor 61.

Yet further, the conductive ring 4 can extend longer also on the side opposite the wireless communication tag 6 in the first direction D1. That is, the end portion of the conductive ring 4 may not be located at the same position as the first coil conductor 31 and may extend longer on the side opposite the wireless communication tag 6 beyond the first coil conductor 31. In other words, in the first direction D1, the end portion of the conductive ring 4 on the side opposite the wireless communication tag 6 may extend longer beyond the end portion of the first coil conductor 31 on the side opposite the wireless communication tag 6.

The outer shapes of the first unit 2, the first coil conductor 31, and the conductive ring 4 (i.e., the shapes as viewed from the first direction D1) may be the same shape or different shapes. That is, the outer shapes of the first unit 2, the first coil conductor 31, and the conductive ring 4 may be formed in a combination of various shapes. If the outer shapes of the first unit 2, the first coil conductor 31, and the conductive ring 4 are the same shape, a small-size, space-saving wireless communication system 1 can be implemented, compared with the configuration in which these elements have different outer shapes.

It is also noted that the material for the second unit 5 may be the same as or different from that of the first unit 2.

The wireless communication tag 6 may not necessarily be disposed on the second side surface 52 of the second unit 5, and may be molded into the second unit 5.

In the wireless communication systems 1 according to the above-described modified examples, advantages similar to the wireless communication system 1 of the first exemplary embodiment are achieved.

Second Exemplary Embodiment

In a second exemplary embodiment, an electrical device 7 using a wireless communication system 1a will be described below with reference to FIG. 8.

(1) Configuration of Electrical Device

Figure 8:
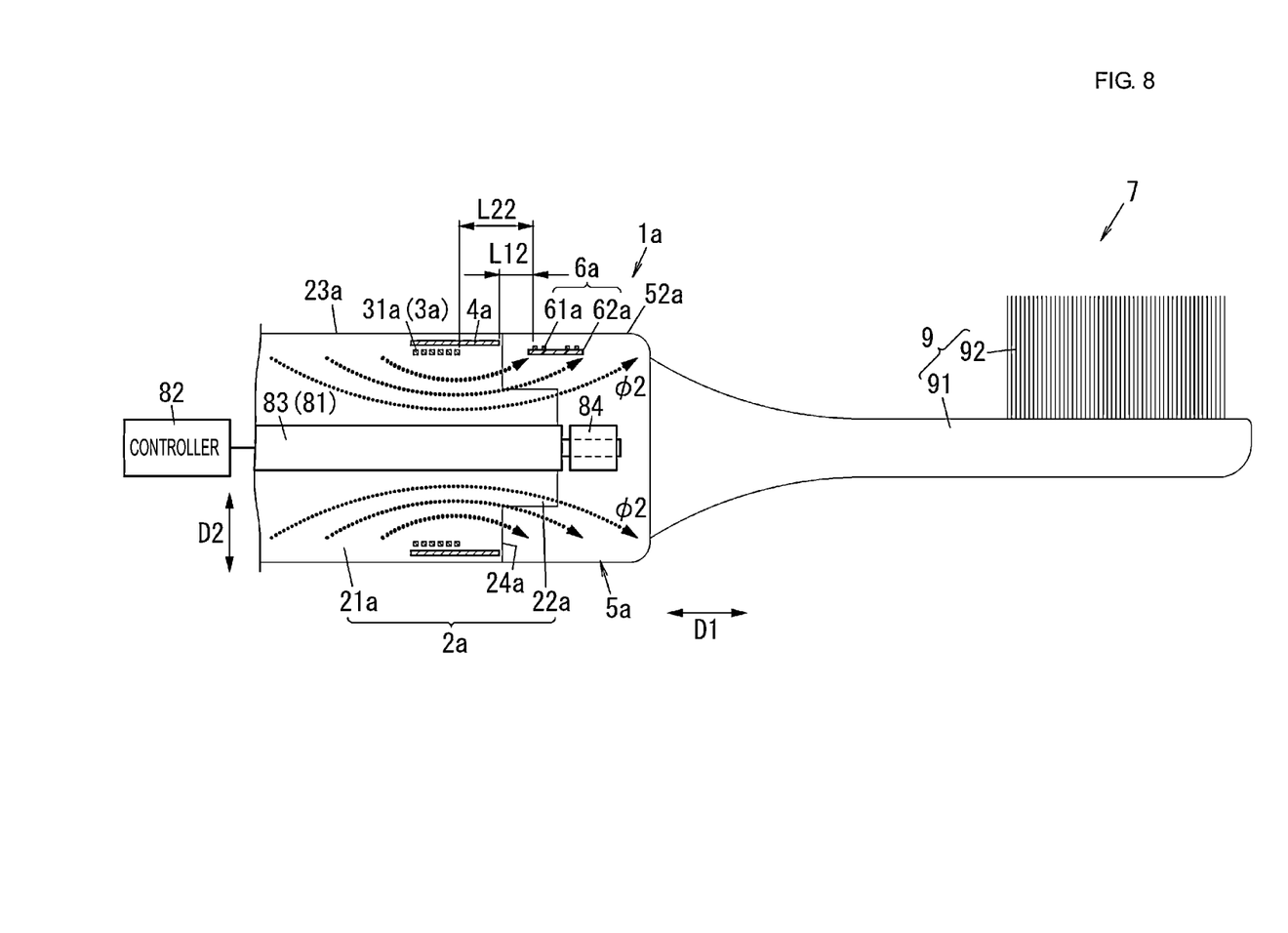
FIG. 8 is a schematic view of the major parts of an electrical device according to a second exemplary embodiment.

As shown in FIG. 8, the electrical device 7 according to the second exemplary embodiment includes the wireless communication system 1a, an operating section 81, a controller 82, and a second mechanism component 9.

As shown in FIG. 8, the wireless communication system 1a of the second embodiment includes a first unit 2a, a coil antenna 3a, a conductive ring 4a, a second unit 5a, and a wireless communication tag 6a. An explanation of the configuration and functions of the wireless communication system 1a of the second exemplary embodiment is similar to those of the wireless communication system 1 (see FIG. 1) of the first exemplary embodiment and will not be repeated.

As in the first embodiment, the first unit 2a includes a base portion 21a (or base) and a projecting portion 22a (or projection), as shown in FIG. 8. The projecting portion 22a is formed integrally with the base portion 21a. The base portion 21a has a first side surface 23a and an opposing surface 24a. The projecting portion 22a projects from the opposing surface 24a of the base portion 21a in the first direction D1. A coil antenna 3a and a conductive ring 4a are stored inside the first unit 2a. An explanation of the configuration and functions of the first unit 2a is similar to those of the first unit 2 (see FIGS. 1 and 2) of the first embodiment and will not be repeated.

As shown in FIG. 8, the coil antenna 3a includes a first coil conductor 31a that is disposed along the first side surface 23a of the first unit 2a. More specifically, the first coil conductor 31a is disposed, not on the first side surface 23a of the first unit 2a, but inside (e.g., embedded in) the first unit 2a. The first coil conductor 31a is sealed with a resin, for example, so as to be provided inside the first unit 2a. An explanation of the configuration and functions of the coil antenna 3a is similar to those of the coil antenna 3 (see FIGS. 1 and 2) of the first embodiment and will not be repeated.

As shown in FIG. 8, the conductive ring 4a is disposed along the first side surface 23a of the first unit 2a. More specifically, the conductive ring 4a is disposed, not on the first side surface 23a of the first unit 2a, but inside the first unit 2a. The conductive ring 4a is sealed with a resin, for example, so as to be provided inside the first unit 2a. In the second embodiment, too, the conductive ring 4a has a slit (not shown) and overlaps the first coil conductor 31a of the coil antenna 3a, as viewed from the second direction D2. An explanation of the configuration and functions of the conductive ring 4a is similar to those of the conductive ring 4 (see FIGS. 1 and 2) of the first embodiment and will not be repeated.

As in the first embodiment, in the first direction D1, the second unit 5a is fixed to the first unit 2a such that it is removable from the first unit 2a, as shown in FIG. 8. The second unit 5a has a recessed portion 51 (see FIG. 2), a second side surface 52a, and an opposing surface 53 (see FIG. 2). The recessed portion 51 receives the projecting portion 22a of the first unit 2a therein. The wireless communication tag 6a is stored inside the second unit 5a. An explanation of the configuration and functions of the second unit 5a is similar to those of the second unit 5 (see FIGS. 1 and 2) of the first embodiment and will not be repeated.

As in the first embodiment, the wireless communication tag 6a includes a second coil conductor 61a, a substrate 62a, and an RFIC (not shown), as shown in FIG. 8. The wireless communication tag 6a is disposed in the second unit 5a. More specifically, the wireless communication tag 6a is disposed, not on the second side surface 52a of the second unit 5a, but inside the second unit 5a. The wireless communication tag 6a is sealed with a resin, for example, so as to be provided inside the second unit 5a. An explanation of the configuration and functions of the wireless communication tag 6a is similar to those of the wireless communication tag 6 (see FIGS. 1 and 2) of the first embodiment and will not be repeated.

The operating section 81 operates in a predetermined manner. More specifically, the operating section 81 includes a first mechanism component 83.

The first mechanism component 83 is disposed farther inward than the first coil conductor 31a in the first unit 2a, as viewed from the first direction D1. More specifically, the first mechanism component 83 is disposed closer to the central portion of the first unit 2a than the first coil conductor 31a of the coil antenna 3a is, as viewed from the first direction D1.

The first mechanism component 83 has an elongated shape. The longitudinal direction of the first mechanism component 83 coincides with the first direction D1. The first mechanism component 83 includes a front end portion 84 which projects from the first unit 2a in the first direction D1. The front end portion 84 of the first mechanism component 83 is stored inside the second unit 5a when the second unit 5a is fixed to the first unit 2a.

The first mechanism component 83 has conductivity and is made of a metal, for example. The material for the first mechanism component 83 is preferably copper, in which case, loss can be decreased compared with when iron is used.

The controller 82 controls the operating section 81 based on information stored in the wireless communication tag 6a. More specifically, the controller 82 is formed by a computer (e.g., a microcomputer) including a processor and a memory. The controller 82 is configured to control the operating section 81 as a result of the processor operating in accordance with a program stored in the memory.

The second mechanism component 9 is disposed in the second unit 5a. The second mechanism component 9 operates together with the first mechanism component 83.

In the example in FIG. 8, the electrical device 7 is an electric toothbrush. In this regard, the second mechanism component 9 includes a handle 91 and a brush 92. The brush 92 is disposed at the front edge of the handle 91.

(2) Positional Relationships Among Conductive Ring, First Coil Conductor, and Second Coil Conductor In the second embodiment, similar to the first embodiment, as shown in FIG. 8, an end portion of the conductive ring 4a is closer to the wireless communication tag 6a than an end portion of the first coil conductor 31a is in the first direction D1. In other words, in the first direction D1, the end portion of the conductive ring 4a on the side of the wireless communication tag 6a is positioned between the wireless communication tag 6a and the end portion of the first coil conductor 31a on the side of the wireless communication tag 6a.

Accordingly, in the first direction D1, a first shortest distance L12 between the conductive ring 4a and the second coil conductor 61a is shorter than a second shortest distance L22 between the first coil conductor 31a and the second coil conductor 61a.

(3) Magnetic Flux Path

As stated above, in the first direction D1, the first shortest distance L12 between the conductive ring 4a and the second coil conductor 61a is shorter than the second shortest distance L22 between the first coil conductor 31a and the second coil conductor 61a. That is, the front edge of the conductive ring 4a is projected farther than that of the first coil conductor 31a. Hence, in the second embodiment, as well as in the first embodiment, magnetic flux $\phi 2$ generated from the coil antenna 3a takes the long way around toward the wireless communication tag 6a so as to avoid the conductive ring 4a.

The first mechanism component 83 is disposed at the central portion of the first unit 2a. The magnetic flux $\phi 2$ generated from the coil antenna 3a is thus less likely to pass near the central portion of the first unit 2a and instead passes at the peripheral portion of the second unit 5a. Hence, a greater amount of magnetic flux $\phi 2$ passes through the wireless communication tag 6a.

(4) Operation of Electrical Device

The operation of the electrical device 7 will be described below with reference to FIG. 8. As noted above, in the example in FIG. 8, the electrical device 7 is an electric toothbrush. The second mechanism component 9 includes the handle 91 and the brush 92. The second mechanism component 9 is attached to the second unit 5a so as to be integrated together. Different information is stored in the wireless communication tag 6a depending on the type of second mechanism component 9.

First of all, the second unit 5a is fixed to the first unit 2a. Before the use of the electrical device 7, the controller 82 causes a current to flow through the coil antenna 3a so as to generate the magnetic flux $\phi 2$ from the coil antenna 3a and obtains information from the wireless communication tag 6a.

Then, the controller 82 operates the first mechanism component 83 of the operating section 81 in accordance with the information obtained from the wireless communication tag 6a. In response to the operation of the first mechanism component 83, the second mechanism component 9 starts operating together. More specifically, the controller 82 operates the first mechanism component 83 and the second mechanism component 9 by adjusting the frequency, amplitude, and time of vibration in accordance with the information obtained from the wireless communication tag 6a.

(5) Advantages

In the wireless communication system 1a and the electrical device 7 according to the second embodiment, the magnetic flux $\phi 2$ generated from the coil antenna 3a can be concentrated on the outer side of the first unit 2a rather than on the inner side of the first unit 2a, thereby enhancing the concentration of the magnetic flux $\phi 2$.

In the electrical device 7 according to the second embodiment, the conductive ring 4a serves to facilitate the induction of the magnetic flux $\phi 2$ generated from the coil antenna 3a to the wireless communication tag 6a. This configuration enhances coupling between the coil antenna 3a and the wireless communication tag 6a.

In the electrical device 7 according to the second embodiment, no matter where the wireless communication tag 6a is disposed with respect to the coil antenna 3a in the circumferential direction, coupling between the coil antenna 3a and the wireless communication tag 6a can be enhanced.

In the electrical device 7 according to the second embodiment, the operating section 81 can be operated in a manner suited to the second unit 5a.

(6) Modified Examples

As in the conductive ring 4 (see FIGS. 1 and 2) of the first embodiment and modified examples thereof, the conductive ring 4a may be disposed outward of the first coil conductor 31a of the coil antenna 3a, as shown in FIG. 8, or may be disposed inward of the first coil conductor 31a in an alternative aspect.

As a modified example of the second embodiment, instead of the wireless communication system 1a, the electrical device 7 may include the wireless communication system 1 of the first embodiment or any one of the wireless communication systems 1 of the modified examples of the first embodiment.

It should be appreciated that the electrical device 7 is not limited to an electric toothbrush. Any device in which plural components are replaceable to be attached to the main body may be used. For example, the electrical device 7 may be an electric tool, a game machine, or a vacuum cleaner.

In the electrical device 7 according to the above-described modified examples, advantages similar to those of the electrical device 7 of the second embodiment are achieved.

The above-described embodiments and modified examples are only examples of the present invention. Various changes may be made to the embodiments and modified examples in accordance with the design, for example, as long as the object of the present invention is achievable.

Exemplary Aspects

According to the above-described embodiments and modified examples, the following exemplary aspects are disclosed.

A wireless communication system according to a first exemplary aspect includes a first unit, a coil antenna, a conductive ring, a second unit, and a wireless communication tag. The first unit includes a first side surface formed by one or plural surfaces. The coil antenna includes a first coil conductor. The first coil conductor is wound along the first side surface of the first unit. The conductive ring is disposed along the first side surface of the first unit and has a slit in a direction perpendicular to a winding direction of the first coil conductor. Moreover, the second unit includes a second side surface formed by one or plural surfaces and is fixed to the first unit so as to be removable from the first unit in a first direction. The wireless communication tag includes a second coil conductor and is disposed along the second side surface of the second unit. In the first direction, a first shortest distance between the conductive ring and the second coil conductor is shorter than a second shortest distance between the first coil conductor and the second coil conductor.

In the wireless communication system according to the first aspect, the conductive ring is configured to facilitate the induction of the magnetic flux generated from the coil antenna to the wireless communication tag. This configuration enhances coupling between the coil antenna and the wireless communication tag.

In the wireless communication system according to a second aspect, in the first aspect, the second unit is fixable to the first unit at at least two positions at which the second unit is rotated around the first direction as an axis with respect to the first unit.

In the wireless communication system according to the second aspect, no matter at any rotating position at which the second unit is fixed to the first unit, it is possible to enhance coupling between the coil antenna and the wireless communication tag.

In the wireless communication system according to a third aspect, in the first or second aspect, in the first unit, a conductive first mechanism component is disposed farther inward than the first coil conductor, as viewed from the first direction.

In the wireless communication system according to the third aspect, magnetic flux generated from the coil antenna can be concentrated on the outer side of the first unit rather than on the inner side of the first unit, thereby enhancing the concentration of the magnetic flux.

In the wireless communication system according to a fourth aspect, in one of the first through third aspects, the conductive ring overlaps at least part of the first coil conductor, as viewed from a second direction perpendicular to the first direction.

In the wireless communication system according to the fourth aspect, it is less likely that magnetic flux passes through a gap between adjacent conductor portions in the first coil conductor. The magnetic flux can thus take the long way around toward the wireless communication tag.

In the wireless communication system according to a fifth aspect, in one of the first through fourth aspects, the first unit includes a base portion and a projecting portion. The base portion has the first side surface. The projecting portion projects from the base portion. The second unit includes a recessed portion. The recessed portion receives the projecting portion therein. An outer shape of the projecting portion is circular, as viewed from the first direction.

In the wireless communication system according to the fifth aspect, the wireless communication tag may be disposed at any position with respect to the coil antenna in the circumferential direction. It is thus possible to enhance coupling between the coil antenna and the wireless communication tag, regardless of where the wireless communication tag is disposed.

In the wireless communication system according to a sixth aspect, in one of the first through fifth aspects, in a second direction perpendicular to the first direction, the conductive ring is disposed outward of the first coil conductor with respect to a winding axis of the first coil conductor.

In the wireless communication system according to the sixth aspect, the conductive ring is not provided at a position at which magnetic flux is concentrated, thereby further enhancing coupling between the coil antenna and the wireless communication tag.

An electrical device according to a seventh aspect includes one of the wireless communication systems according to the first through sixth aspects, an operating section, and a controller. The operating section operates in a predetermined manner. The controller controls the operating section in accordance with information stored in the wireless communication tag.

In the electrical device according to the seventh aspect, the conductive ring is configured to facilitate the induction of magnetic flux generated from the coil antenna to the wireless communication tag. This can enhance coupling between the coil antenna and the wireless communication tag.

In the electrical device according to the seventh aspect, as a result of controlling the operating section in accordance with the information stored in the wireless communication tag, the operating section can be operated in a manner suited to the second unit.

In the electrical device according to an eighth aspect, in the seventh aspect, the operating section includes a conductive first mechanism component. The first mechanism component is disposed closer to a central portion of the first unit than the first coil conductor is, as viewed from the first direction.

In the electrical device according to the eighth aspect, magnetic flux generated from the coil antenna can be concentrated on the outer side of the first unit rather than on the inner side of the first unit, thereby enhancing the concentration of the magnetic flux.

A wireless communication tag according to a ninth aspect is used in a wireless communication system. The wireless communication system includes a first unit, a coil antenna, a conductive ring, a second unit, and a tag. The first unit includes a first side surface formed by one or plural surfaces. The coil antenna includes a first coil conductor. The first coil conductor is wound along the first side surface of the first unit. The conductive ring is disposed along the first side surface of the first unit and has a slit in a direction perpendicular to a winding direction of the first coil conductor. The second unit includes a second side surface formed by one or plural surfaces and is fixed to the first unit so as to be removable from the first unit in a first direction. The tag is disposed along the second side surface of the second unit. The wireless communication tag is used as the tag of the wireless communication system. The wireless communication tag includes a second coil conductor. In the first direction, a first shortest distance between the conductive ring and the second coil conductor is shorter than a second shortest distance between the first coil conductor and the second coil conductor.

In the wireless communication tag according to the ninth aspect, the conductive ring is configured to facilitate the induction of magnetic flux generated from the coil antenna to the wireless communication tag. This configuration enhances coupling between the coil antenna and the wireless communication tag.

REFERENCE SIGNS LIST 1, 1a wireless communication system
2, 2a first unit
21, 21a base portion
22, 22a projecting portion
23, 23a first side surface
3, 3a coil antenna
31, 31a first coil conductor
4, 4a conductive ring
41 slit
5, 5a second unit
51 recessed portion
52, 52a second side surface
6, 6a wireless communication tag
61, 61a second coil conductor
7 electrical device
81 operating section
82 controller
83 first mechanism component L11, L12 first shortest distance
L21, L22 second shortest distance
$\phi 1$, $\phi 2$ magnetic flux
D1 first direction
D2 second direction

The invention claimed is:

1. A wireless communication system comprising:
a first unit that includes a first side surface;
a coil antenna that includes a first coil conductor wound along the first side surface of the first unit;
a conductive ring that is disposed along the first side surface of the first unit and has a slit that extends in a direction perpendicular to a winding direction of the first coil conductor;
a second unit that includes a second side surface and that is constructed to be removably fixed to the first unit in a first direction; and
a wireless communication tag that includes a second coil conductor and is disposed along the second side surface of the second unit,
wherein, in the first direction, a first shortest distance between the conductive ring and the second coil conductor is shorter than a second shortest distance between the first coil conductor and the second coil conductor.

2. The wireless communication system according to claim 1, wherein the first side surface of the first unit is formed by one or a plurality of surfaces and the second side surface of the second unit is formed by one or a plurality of surfaces.

3. The wireless communication system according to claim 1, wherein the second unit is constructed to be fixable to the first unit at at least two positions at which the second unit is rotated around the first direction as an axis with respect to the first unit.

4. The wireless communication system according to claim 1, wherein the first unit comprises a conductive mechanism component that is disposed farther inward than the first coil conductor relative to the first direction.

5. The wireless communication system according to claim 1, wherein the conductive ring overlaps at least part of the first coil conductor when viewed from a second direction that is perpendicular to the first direction.

6. The wireless communication system according to claim 1,
wherein the first unit includes a base that includes the first side surface and a projection that extends from the base, and
wherein the second unit includes a recess constructed to receive the projection therein.

7. The wireless communication system according to claim 6, wherein an outer shape of the projection is circular when viewed from the first direction.

8. The wireless communication system according to claim 7, wherein an axis of the projection is coaxial with an axis of the base of the first unit.

9. The wireless communication system according to claim 1, wherein, in a second direction that is perpendicular to the first direction, the conductive ring is disposed outward of the first coil conductor with respect to a winding axis of the first coil conductor.

10. The wireless communication system according to claim 1, wherein, in a second direction that is perpendicular to the first direction, the conductive ring is disposed inward of the first coil conductor with respect to a winding axis of the first coil conductor.

11. The wireless communication system according to claim 1, wherein the slit leaves a portion of the first coil conductor exposed.

12. The wireless communication system according to claim 1, wherein the conductive ring has a front edge facing that second unit that is closer than a front edge of the first coil conductor that is facing the second unit.

13. An electrical device comprising:
the wireless communication system according to claim 1;
an operating section that operates in a predetermined manner; and
a controller configured to control the operating section based on information stored in the wireless communication tag disposed on the second unit.

14. The electrical device according to claim 13, wherein the operating section includes a conductive mechanism component that is disposed closer to a central portion of the first unit than the first coil conductor when viewed from the first direction.

15. A wireless communication tag configured to be used in a wireless communication system that includes a first unit having a first side surface, a coil antenna with a first coil conductor wound along the first side surface, and a conductive ring that is disposed along the first side surface and has a slit in a direction perpendicular to a winding direction of the first coil conductor, and a second unit that includes a second side surface and that is removably fixed to the first unit, the wireless communication tag being disposed along the second side surface of the second unit and comprising:
a second coil conductor,
wherein, when the second unit is fixed to the first unit, a first shortest distance between the conductive ring and the second coil conductor in the first direction is shorter than a second shortest distance between the first coil conductor and the second coil conductor in the first direction.

16. The wireless communication tag according to claim 15, wherein the conductive ring overlaps at least part of the first coil conductor when viewed from a second direction that is perpendicular to the first direction.

17. The wireless communication tag according to claim 15, wherein the first unit includes a base that includes the first side surface and a projection that extends from the base, and the second unit includes a recess constructed to receive the projection therein.

18. The wireless communication tag according to claim 17, wherein an outer shape of the projection is circular when viewed from the first direction.

19. The wireless communication tag according to claim 18, wherein an axis of the projection is coaxial with an axis of the base of the first unit.

20. The wireless communication tag according to claim 15, wherein, in a second direction that is perpendicular to the first direction, the conductive ring is disposed outward of the first coil conductor with respect to a winding axis of the first coil conductor.

* * * * *